United States Patent [19]

Guzy

[11] 4,370,518
[45] * Jan. 25, 1983

[54] SPLICE FOR LEAD-COATED AND INSULATED CONDUCTORS

[75] Inventor: Raymond L. Guzy, Morton Grove, Ill.

[73] Assignee: Hughes Tool Company, Houston, Tex.

[*] Notice: The portion of the term of this patent subsequent to Nov. 18, 1997, has been disclaimed.

[21] Appl. No.: 287,400

[22] Filed: Jul. 27, 1981

Related U.S. Application Data

[63] Continuation of Ser. No. 99,692, Dec. 3, 1979, abandoned.

[51] Int. Cl.³ .................. H01R 4/70; H02G 15/08
[52] U.S. Cl. ..................... 174/84 R; 156/49
[58] Field of Search ............ 174/84 R, 88 R, DIG. 8; 156/49; 29/869

[56] References Cited

U.S. PATENT DOCUMENTS

| 3,035,113 | 5/1962 | Danchuk | 174/74 A |
|---|---|---|---|
| 3,127,291 | 3/1964 | Betz et al. | 174/84 R |
| 3,691,505 | 9/1972 | Graves | 174/84 R X |
| 3,717,717 | 2/1973 | Cunningham et al. | 174/88 R X |
| 3,781,458 | 12/1973 | May | 174/84 R X |
| 4,234,758 | 11/1980 | Guzy | 174/84 R |
| 4,273,953 | 6/1981 | Guzy | 174/84 R |

Primary Examiner—A. T. Grimley
Assistant Examiner—D. A. Tone
Attorney, Agent, or Firm—Robert A. Felsman; Charles D. Gunter, Jr.

[57] ABSTRACT

A cable splice joining insulated conductor ends wherein the conductors are coated with lead, lead-tin alloy or tin, said splice comprising a metallic sleeve member joining the conductor ends, a first layer of adhesive over the sleeve member and any exposed conductor areas, a layer of foil formed of lead or lead-tin alloy covering the first adhesive layer, a second adhesive layer covering said layer of foil and extending over the exposed insulation; a helically-wrapped insulation layer formed of a thermosetting polymer, an over-lapped layer of fabric surrounding the insulation layer, a helically-wrapped heat-shrinkable type layer surrounding the fabric layer, and a heat-shrinkable sleeve surrounding the splice area, and a method for forming said cable splice, for providing cable splices which resist depressurization failure and corrosion of conductors when employed in high pressure gassy oil wells containing corrosive well fluids.

8 Claims, 1 Drawing Figure

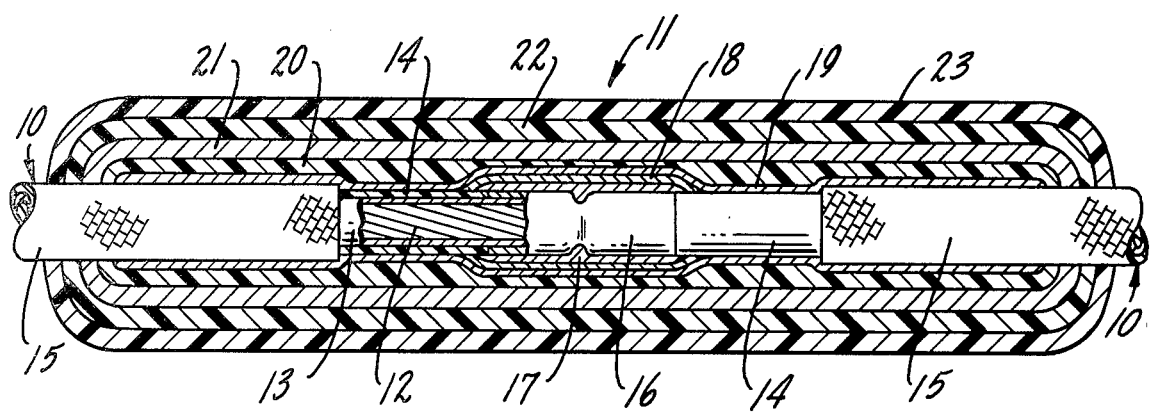

SPLICE FOR LEAD-COATED AND INSULATED CONDUCTORS

This application is a continuation of application Ser. No. 99,692, filed Dec. 3, 1979, now abandoned.

BACKGROUND OF THE INVENTION

This invention relates to a cable splice for an electrical cable and to a method for making a cable splice. More particularly, this invention relates to a cable splice for use in high temperature, high pressure gassy oil wells adapted to prevent depressurization-caused rupture failures and to avoid corrosion and destruction of the conductors by sulfide gases, and to a method for making said cable splices.

In general, cable structures employed for oil well service have stranded metallic conductors, usually formed of copper, separately insulated with a material of high dielectric strength, cabled and surrounded by an outer armor. In joining cable sections, a splice is formed between the conductors comprising a metallic member frictionally engaging the conductors which is insulated by a section of insulant surrounding any remaining exposed areas of the conductors and the metallic member. The section of insulant typically is formed by a plurality of layers of insulating tape, which may be further protected and confined by a heat shrinkable sleeve positioned over the splice insulation and extending over the adjacent insulation to seal the splice area.

Where the well cable is to be employed in highly gassy wells containing corrosive gases, particularly sulfides, invasion of the cable structure by low molecular weight hydrocarbons and corrosive well fluids under high pressure occurs either by way of pinholes or other defects in the primary insulation of the cable or by gas permeation.

When the cable is removed from the well bore, the external pressure is decreased, creating an unbalanced high pressure condition within the splice structure which leads to blow-out or rupture failure. Further, the conductors are particularly susceptible to attack and corrosion by the sulfides, which results in destruction of the conductors and a shortened cable life.

One method for preventing sulfide attack on the conductors has been the coating of the conductor with a sulfide-impervious layer such as metallic lead, a lead-tin alloy, or tin. The coating acts as a barrier to prevent contact of the sulfide-containing fluids with the conductor.

A method for forming a cable splice between conductors coated with lead, lead-tin alloy or tin is needed which would prevent contact of the conductors in the splice area by corrosive well-fluids and which could be carried out rapidly under field conditions.

SUMMARY OF THE INVENTION

This invention provides a cable splice that is resistant to blow-out and rupture failure, and which protects the conductors from destruction by corrosive well fluids and consequent corrosive failure, and a method for making said cable splice. More particularly, this invention provides a cable splice having an adhesive layer, a foil layer, a second adhesive layer, an insulation layer formed of a thermosetting elastomeric polymer having a limited degree of porosity, a fabric layer which surrounds and confines the insulation layer and two layers of heat-shrinkable polymer, and a method for splicing and insulating an electrical cable.

The cable conductors to be joined through the splice of this invention will typically comprise a stranded conductor encased in a coating of lead, lead-tin alloy or tin, an insulation layer surrounding the conductors, and fiber braid surrounding the insulation layer. To form the splice the conductors are trimmed to expose undamaged ends, the braid layer, if present, is trimmed to expose a portion of the primary insulation, which also is trimmed to expose a portion of the coated conductor. The exposed insulation is scraped or buffed to remove dirt and roughen the surfaces. The exposed conductor ends are joined by conventional means such as with a deformable metallic sleeve, and the metallic sleeve and any remaining exposed area of the conductors is coated with an adhesive. An elongated strip of foil formed from lead or lead-tin alloy is then applied over the exposed conductors and joint area. The foil, the exposed insulation and a portion of the braid layer is then coated with an adhesive, and insulating tape formed of a thermosetting elastomeric polymer is helically wound over the foil layer and exposed insulation. An elongated strip of fabric is applied over the insulating tape in overlapped relationship and is optionally secured by application of an adhesive to the end portions and lap area. The fabric is then covered with a helically-wound layer of heat-shrinkable tape, and a sleeve member formed of heat-shrinkable tubing is positioned to extend over splice area including any braid-covered portions. Heat sufficient to shrink the heat-shrinkable tape and tubing is then applied to compress and secure the insulation, fabric and foil layers.

The splice made in accordance with this invention is suitable for service when immersed in and surrounded by corrosive well fluids under high temperatures and pressures, and is not susceptible to depressurization failure or corrosion of the conductors. Corrosive well fluids including sulfides are excluded from the conductor area of the splice structure by the lead foil, thus preventing attack on the conductors and subsequent failure. Where minor amounts of low molecular weight well fluids permeate the somewhat porous insulation layer, the fabric layer restrains the insulation layer against swell and rupture from high internal pressures, and the low molecular weight fluids are desorbed without rupture or damage to the insulation.

DESCRIPTION OF THE DRAWING

The FIGURE is a side view in partial section showing a pair of cable ends joined through a cable splice.

DESCRIPTION OF THE PREFERRED EMBODIMENT

Referring now to the drawing, there is shown a pair of cable ends 10 which have metallic conductors 12 having coating 13 formed of lead, lead tin-alloy or tin, covered with insulation 14, and braid layer 15. Conductors of this construction are known in the cable art and do not form a part of the instant invention. The cable ends 10 are joined through cable splice 11, comprising a metallic sleeve 16, first adhesive layer 17, foil layer 18, second adhesive layer 19, insulating tape layer 20, fabric layer 21, heat-shrinkable polymeric tape layer 22 and heat-shrinkable sleeve layer 23.

In forming a cable splice according to the instant invention, cable ends 10 are trimmed to remove a section of the insulation to expose lengths of the conductors 12 and coating 13, and further trimmed to remove a section of braid layer 15 to expose lengths of the insulation 14. The exposed conductors are joined by inserting in a metallic sleeve 16, which is then deformed to frictionally engage the conductors.

The metallic sleeve and any exposed areas of the conductors and coating are then coated with an adhesive 17. Adhesives suitable for the purposes of this invention generally are liquid, preferably solvent-free, adhesives such as, for example, liquid epoxy resins, liquid urethanes, and the like, which cure without heat to form a strong, flexible, water- and oil-impervious bond. The adhesive serves to form a tight bond between the metallic sleeve and the foil layer subsequently applied over the adhesive layer. A layer 18 of foil formed of lead or lead-tin alloy is then applied to the metallic sleeve and any exposed areas of the coated conductors over the adhesive layer. The foil, the exposed areas of the insulation and, preferably, a portion of the braid are then coated with a further layer of adhesive 19.

One or more layers of insulating tape 20 is then applied over the second adhesive layer 19 in the splice area with a helical wrap to cover the exposed insulation. In general, it will be desirable to first apply sufficient insulating tape over the foil-covered metallic sleeve area to fill the area to the level of the adjacent cable insulation, then to complete the layer with a single helical wrap extending over the exposed insulation at each end. The insulating tape is formed of a thermosetting elastomeric polymer which, when cured, is an excellent electrical insulator at elevated temperatures and virtually impervious to attack by oil and other well fluids. An essential property of the polymer is a limited degree of porosity in that it is capable of imbibing very low molecular weight hydrocarbons when under high pressure and then readily desorbing the imbibed gassy hydrocarbons when external pressure is removed. One such material useful for these purposes is a modified EPDM (ethylene-propylene-diene monomer terpolymer) blend such as is disclosed in U.S. Pat. No. 3,926,900. When employed for the purposes of this invention in the form of an insulating tape, the polymer is uncured, the requisite curing being carried out when construction of the splice is completed.

Over the layer of insulating tape 20 is placed a single wrap of fabric 21. The fabric may be applied in the form of an elongated strip wrapped to overlap along the length of the splice. Fabric 21 may alternatively be applied in the form of a fabric tape helically wound along the length of the splice. A number of woven fabric materials may be used for the purposes of this invention including, for example, nylon, polyester, rayon, fluorocarbon, cotton, fabrics formed from glass filament or fiber and the like. It is essential that the fabric withstand exposure to the well fluids without degradation or substantial loss in tensile strength. A liquid adhesive may be applied to the lap area and to the end areas.

Over the fabric layer is applied a single, helically-wound tape layer 22 formed of heat-shrinkable polymeric material such as PTFE, PFE and the like.

A sleeve 23 of heat-shrinkable tubing is then positioned to surround the splice area, extending over a portion of the braid at both ends of the splice area. Heat is then applied to the entire splice to shrink the sleeve 23 and the heat-shrinkable tape layer 22, thus compressing and tightly confining the insulation and fabric layers. Multiple wraps of heat-shrinkable tape are to be avoided. For the purposes of this invention, the combination of the heat-shrinkable tape and sleeve are intended only to confine and compress the insulation and fabric layers, and not to form a complete seal against the intrusion of corrosive well fluids.

The splice may then be further heated to effect curing of the insulation layer. This curing step is optional since the temperatures encountered in service in most wellbore applications will quickly effect the requisite curing.

EXAMPLE 1

A splice was constructed according to the principles set forth above, employing nylon fabric as the fabric layer, 4 mil lead foil to form the foil layer, PFE to form the heat-shrinkable tape layer and PFE heat-shrinkable tubing to form the sleeve layers, and cured at 325°–350° F. The splice was placed in a pressure vessel containing 5% aqueous ammonium sulfide, heated 5% to 300° F. and held for one week. On removal from the test vessel, the cable was dissected and the splice examined. No erosion of the conductors or insulation had occurred.

EXAMPLE 2

A splice was constructed for comparison purposes essentially according to the principles set forth above, as in Example 1., but the lead foil layer was omitted. After exposure to aqueous ammonium sulfide at 300° F. for one week, upon subsequent removal the insulation had split, the conductors had eroded to a flakey, crystalline material, and the metallic sleeve had corroded and split. It will thus be apparent that the lead foil layer effectively prevents contact of the conductors by the corrosive sulfide fluid and consequent destruction of the conductors.

The invention will thus be seen to be a cable splice which is resistant to attack by corrosive well fluids and to depressurization-caused blow-outs and rupture, and a method for forming a cable splice.

I claim:
1. A cable splice comprising:
   a metallic sleeve member extending over conductor end portions and frictionally engaging the conductor end portions;
   a first layer of adhesive covering said sleeve member and extending over exposed conductor end portions;
   a layer of foil covering said first layer of adhesive, said foil formed of lead or lead-tin alloy;
   a second layer of adhesive covering said layer of foil and extending over the exposed cable insulation;
   a helically wrapped insulation layer of uncured thermosetting elastomeric polymer tape surrounding said second layer of adhesive;
   an overlapped layer of fabric;
   a helically-wrapped layer of heat-shrinkable polymeric material tape surrounding said layer of fabric; and
   a sleeve of heat shrinkable polymeric material surrounding said layer of heat shrinkable polymeric material tape.
2. The cable splice of claim 1 wherein the fabric layer end portions and lap area are coated with adhesive.
3. The cable splice of claim 1 wherein the thermosetting elastomeric tape is thermally-cured.
4. A method for forming a cable splice comprising the steps of joining the exposed conductor ends with sleeve means frictionally engaging said conductors;

coating the sleeve means and the exposed conductors with a first layer of liquid adhesive;

applying a foil formed of lead or lead-tin alloy over the first adhesive layer;

applying a second layer of liquid adhesive over the layer of foil and extending over the exposed insulation;

applying an insulation layer of uncured thermosetting elastomeric tape over the second adhesive layer in a helical wrap;

applying an overlapping layer of fabric to surround said insulation layer;

applying a layer of heat-shrinkable polymeric material tape in a helical wrap to surround said fabric; and positioning a sleeve of heat-shrinkable polymeric material to surround the layer of heat shrinkable tape.

5. The method of claim 4 further comprising the step of thermally-treating the splice to shrink said heat-shrinkable polymeric materials.

6. A cable splice comprising:

a metallic sleeve member extending over conductor end portions and frictionally engaging the conductor end portions;

a first layer of adhesive covering said sleeve member and extending over exposed conductor end portions;

a helically wrapped insulation layer of uncured thermosetting elastomeric polymer tape surrounding said layer of adhesive;

an overlapped layer of fabric;

a helically-wrapped layer of heat-shrinkable polymeric material tape surrounding said layer of fabric;

a sleeve of heat shrinkable polymeric material surrounding said layer of heat shrinkable polymeric material tape; and a layer of foil located intermediate said metallic sleeve member and said helically-wrapped layer of heat-shrinkable polymeric material tape, said layer of foil being covered with a second layer of adhesive covering.

7. The cable splice of claim 6, wherein the fabric layer end portions are coated with adhesive.

8. A method for forming a cable splice comprising the steps of:

joining the exposed conductor ends with sleeve means frictionally engaging said conductors;

coating the sleeve means and the exposed conductors with a first layer of liquid adhesive;

applying an insulation layer of uncured thermosetting elastomeric polymer tape over the first layer of liquid adhesive in a helical wrap;

applying an overlapping layer of fabric to surround said insulation layer;

applying a layer of heat-shrinkable polymeric material tape in a helical wrap to surround said fabric;

positioning a sleeve of heat-shrinkable polymeric material to surround the layer of heat shrinkable tape; and positioning a layer of foil intermediate said metallic sleeve member and said helically wrapped layer of heat-shrinkable polymeric material tape, said layer of foil being covered with a second layer of adhesive covering.

* * * * *